United States Patent [19]

Gordon et al.

[11] Patent Number: 4,796,991
[45] Date of Patent: Jan. 10, 1989

[54] METHOD AND APPARATUS FOR MEASURING SOFT CONTACT LENSES

[76] Inventors: Michael D. Gordon, 10225 E. 71st South, Derby, Kans. 67233; Norris R. Long, 5166 S. Vine, Wichita, Kans. 67217

[21] Appl. No.: 51,719

[22] Filed: May 20, 1987

[51] Int. Cl.⁴ .............................................. G01B 9/00
[52] U.S. Cl. .................................... 356/125; 356/124
[58] Field of Search ............................. 356/124–127; 350/580

[56] References Cited

U.S. PATENT DOCUMENTS

| | | | |
|---|---|---|---|
| 3,402,418 | 9/1968 | LeRoy | 350/582 |
| 3,985,445 | 10/1976 | Tagnon | 356/125 |
| 4,277,172 | 7/1981 | Richards | 356/125 |
| 4,395,120 | 7/1983 | Takahashi | 356/125 |
| 4,496,243 | 1/1985 | Machida | 356/125 |

Primary Examiner—Richard A. Rosenberger
Assistant Examiner—Crystal Cooper
Attorney, Agent, or Firm—Phillip A. Rein

[57] ABSTRACT

This invention relates to a method and apparatus for measuring the optical power of soft contact lenses having a lens holding apparatus which is mountable on known prior art lensmeter structures. The lens holding apparatus includes a basic support housing means, a lens holder assembly mounted on the basic support housing means, and a lens conditioner means connected to the basic support housing means and operably engagable with the lens holder assembly. The lens holder assembly includes a contoured lens support member having a transparent lens support surface to substantially duplicate the outer contour and size of a person's eye. The lens conditioner means includes a lens wiper assembly operable through an actuator linkage assembly to move a wiper blade member over the contoured lens support member with a soft contact lens mounted thereon to provide a wetting action on both sides of the soft contact lens to duplicate the conditions when worn on the cornea of a person's eye. This operation substantially duplicates the condition of the soft contact lens as being worn on the cornea of a person's eye. The method of this invention relates to optical power measurement with the use of a lens support member being (1) cleansing; (2) wetting; (3) wiping; (4) measuring the soft contact lens; and (5) periodically rewetting and operating the device as required.

20 Claims, 2 Drawing Sheets

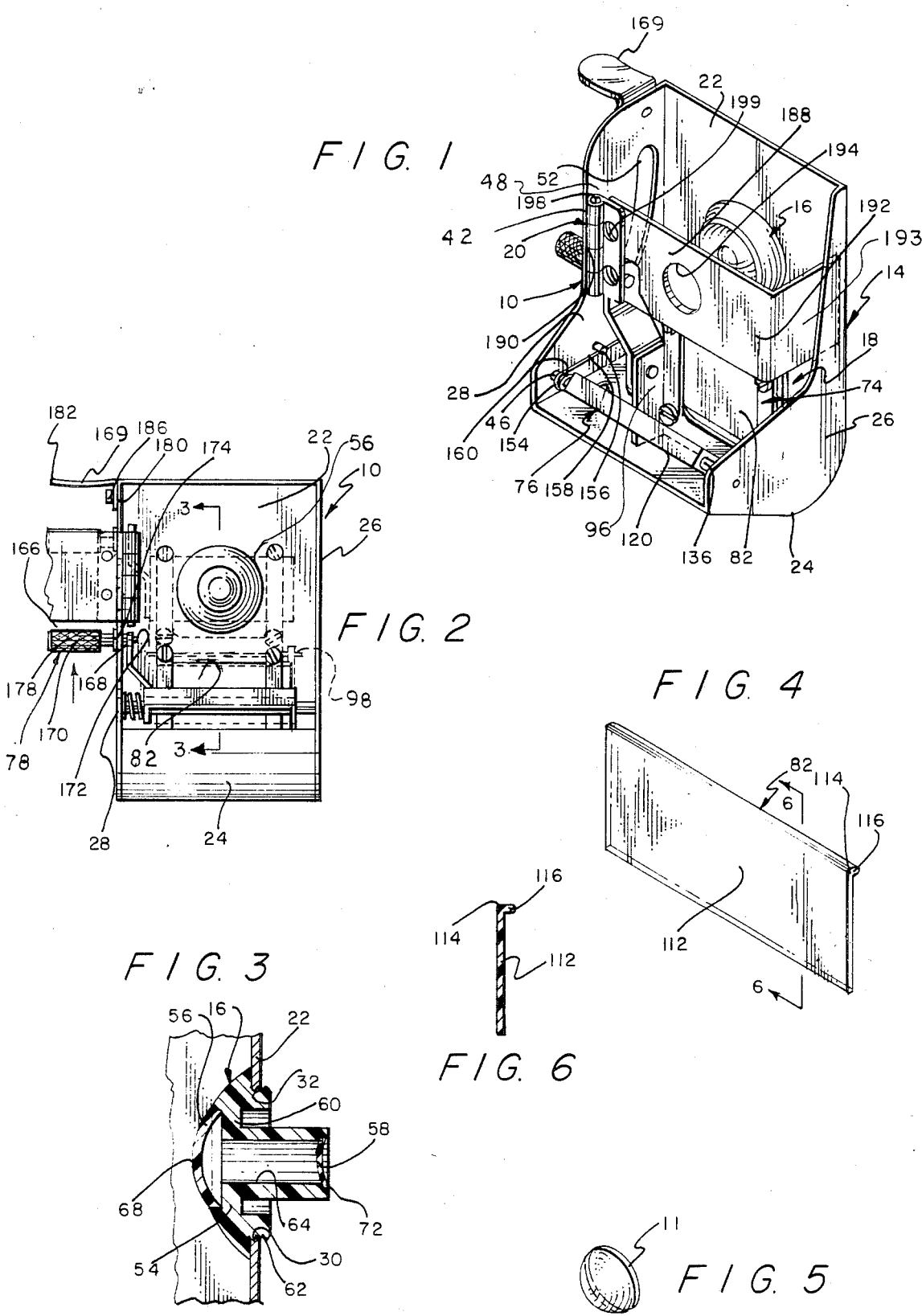

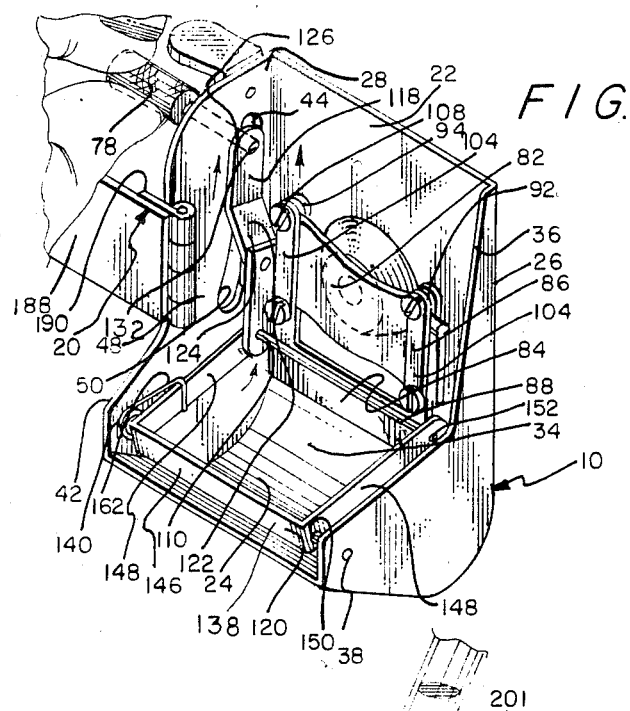
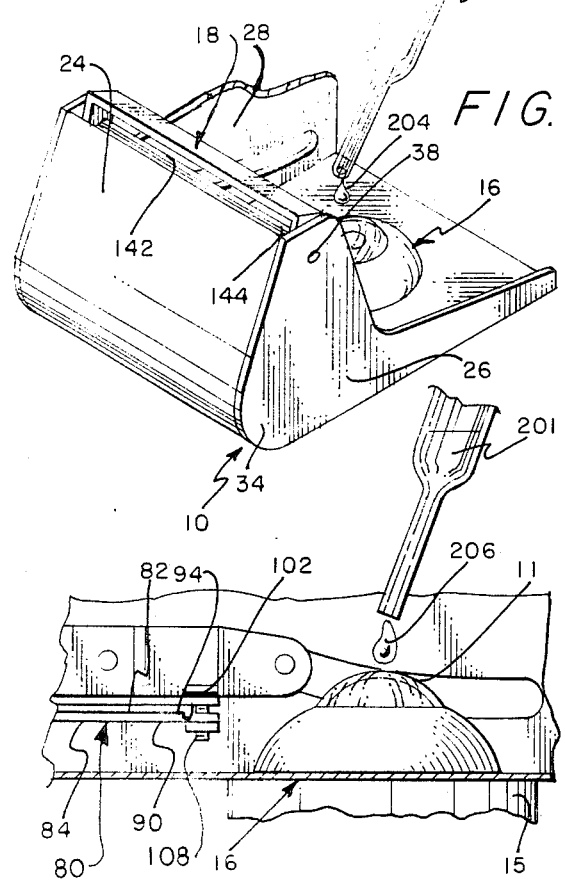
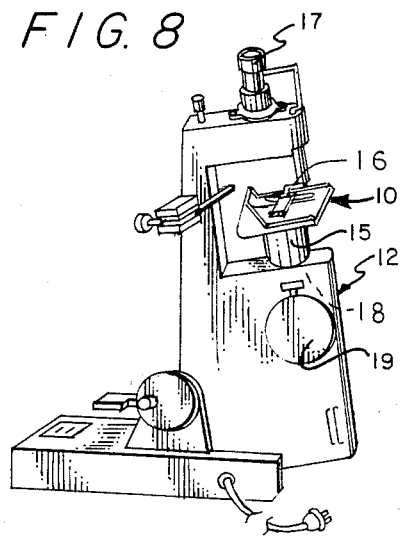
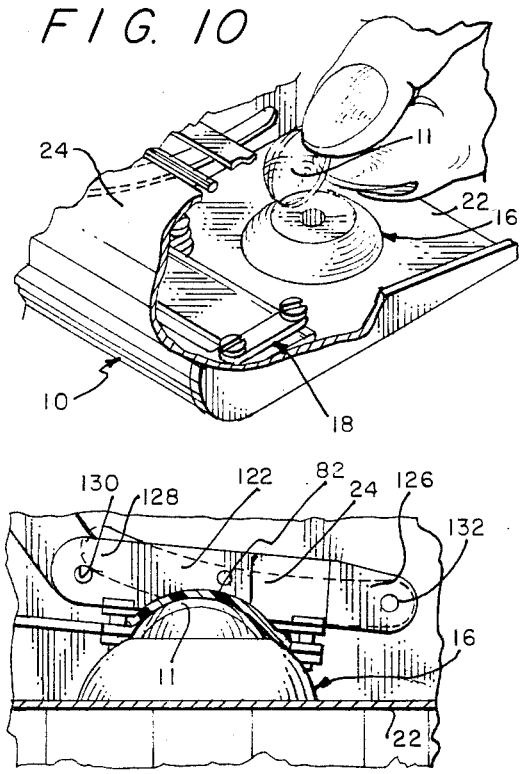
FIG. 7
FIG. 8
FIG. 9
FIG. 10
FIG. 11
FIG. 12

METHOD AND APPARATUS FOR MEASURING SOFT CONTACT LENSES

PRIOR ART

A "State of the Art Search" was conducted on the above identified invention in regard to means and methods of measuring the power of hard and soft contact lenses and the following United States Patents are noted:

| Reg. No. | Invention | Inventor |
| --- | --- | --- |
| 3,776,620 | OPTHALMOMETER HAVING ALTERNATIVE VIEWING AND MEASURING SYSTEMS | Dianetti et al |
| 3,778,164 | OPTHALMOMETER HAVING ALTERNATIVE VIEWING MEASURING SYSTEMS AND INCLUDING IMPROVED CONTACT LENSHOLDING MEANS | Walker |
| 3,804,523 | RADIUSCOPE THICKNESS ADAPTOR | McCormack |
| 3,820,899 | POWER AND SURFACE INSPECTION ADAPTOR PLATE | McCormack |
| 3,861,808 | INSTRUMENT FOR MEASURING CURVED SURFACES | Halsey |
| 3,917,391 | PROJECTION SYSTEM FOR MEASURING CURVES AND CROSS SECTIONAL DIMENSIONS OF HYDROPHILIC CONTACT LENSES | Padula et al |
| 3,985,445 | APPARATUS FOR MEASURING FRONTAL POWER OF CONTACT LENSES | Tagnon |
| 4,072,428 | INSPECTING AND MEASURING OF SOFT CONTACT LENS | Moss |
| 4,149,801 | METHOD AND APPARATUS FOR MEASURING ASPHERIC CONTACT LENS SURFACES | Volk |
| 4,225,231 | APPARATUS FOR MEASURING THE RADII OF CONTACT LENSES | Wilms |
| 4,283,139 | INSTRUMENT FOR OPTICALLY MEASURING SOFT CONTACT LENS PARAMETERS | Swope |

Numerous of the above cited patent references are not pertinent to the applicant's specific invention as it is drawn to the area utilizing a lensmeter for measuring soft contact lenses with a lens holding apparatus.

The McCormack U.S. Pat. No. 3,804,523 discloses a radiuscope thickness adaptor to measure the thickness of flexible lenses but is substantially different in structure and operation relative to applicant's invention.

A second McCormack U.S. Pat. No. 3,820,899 is also drawn to a surface inspection adaptor plate for use with flexible type lenses but fails to provide sufficient support to the lens to achieve accurate power measuring results.

The Moss patent discloses a structure for inspecting and measuring of soft contact lenses having a mold to hold a soft contact lens thereon and used with a conventional lensmeter. This method doesn't duplicate the conditions of holding a contact lens similar to that as being worn on a person's eye.

Prior art methods of measuring the power of a soft contact lens are known being (1) the use of a holder to place the lens thereon which is mounted dry on a particular holder as shown by the Moss and McCormack patents; and (2) using a wet cell in which the cell is a thin plastic cube having a saline solution therein whereupon the lens is allowed to free float in subject plastic cube. The first method is not satisfactory as the lens will dry up and obtain a false reading. The wet cell is not satisfactory as the lens will free-float and not remain in the proper position and causes distorted optical readings. Additionally, the fluid on both sides of the soft contact lens in varying dimensions results in poor optical measurement readings due to refractive index differences.

PREFERRED EMBODIMENT OF THE INVENTION

In one preferred embodiment of this invention, a method and apparatus for measuring soft contact lens includes a lens holding apparatus which is operable to support a soft contact lens thereon and usable with numerous types of lensmeters. The lensmeter is a well known structure utilizing an internal target and a focus knob to move the target relative to the contact lens to measure the relative strength or optical power thereof. The lens holding apparatus includes a basic support housing means; a lens holder assembly mounted on the basic support housing means; a lens conditioner means mounted on the basic support housing means and engagable with the lens holder assembly; and a lens guard and connector assembly mounted on the basic support housing means. The basic support housing means is provided with a main support wall integral therewith upwardly extended arcuate end wall, first side wall, and second side wall to form an open structure operable to act as a support structure and an excessive solution receiver during use thereof. The lens holder assembly includes a lens support base having a contoured lens support member thereon. The lens conditioner means includes a lens wiper assembly; an actuator linkage assembly operably connected to the lens wiper assembly; and an actuator movement assembly connected to the actuator linkage assembly. The lens wiper assembly includes a wiper blade member which is selectively operable through the actuator linkage assembly and the actuator movement assembly to provide movement of the wiper blade member over a top surface of the contoured lens support member. The wiper blade member also provides for the conditioning and wiping of a soft contact lens member when mounted on the lens support member. The lens guard and connector assembly includes a connector body member pivotally connected to the basic support flange assembly and moveable from a first protective and connector position over the lens holder assembly to a second upright position to allow access for placing and removing a contact lens member from the contoured lens support member. The method of measuring soft contact lens of this invention involves the use of the lens holding apparatus to be placed on a lensmeter involving the steps of (1) placing the lens guard and connector assembly in an open condition to allow access to the lens holder assembly; (2) selecting a particular one of a lens holder assembly with the required curvature of a contoured lens support member thereon in regard to the curvature of a contact lens member to be examined; (3) cleaning the outer surface of the contoured lens support member with a lens cleaning solution; (4) applying a soft lens saline solution on the contoured lens support surface to remove the cleansing solution and provide a compatible chemcial solution with the contact lens to be placed thereon; (5) placing a soft contact lens on the fluid covered lens support surface; (6) actuating the actuator movement assembly through the actuator linkage assembly to move the wiper blade member across the top surface of the contact lens member held on the lens support surface; (7) lowering the lens guard and connector assembly to provide protection over the contoured lens support member and the flexible soft contact lens thereon; (8) operating the lensmeter in a conventional manner to move the internal target relative to the soft contact lens to provide a reading of the optical power thereof; and (9) periodically rewetting the lens as necessary due to dehydration of the fluid thereon.

OBJECTS OF THE INVENTION

One subject of this invention is to provide a method and apparatus for measuring soft contact lens having a lens holding apparatus adapted to receive and hold a soft contact lens for optical measuring and ressembling the exact condition of the soft contact lens when placed on a person's eye.

One other object of this invention is to provide a method and apparatus for measuring soft contact lens which is operable to provide consistent, accurate measurements of the power of a soft contact lens while holding same in a proper, stationary condition without causing damage thereto.

Still, one other object of this invention is to provide a lens holding apparatus usable with a lensmeter including a lens holder assembly mounted on a basic support means and a lens conditioner means having a lens wiper assembly operable to achieve a uniform thickness of fluid covering to both sides of a soft contact lens to achieve accurate power measurement of the soft contact lens and adequate hydration of the lens.

One further object of this invention is to provide a lens holding apparatus having a lens holder assembly with a contoured lens support member which duplicates an outer portion of a person's eyeball structure and having (1) a lens support surface to receive soft contact fluid and a soft contact lens thereon; and (2) a lens conditioner means having a wiper blade member to contact and smooth the soft contact lens on the lens support surface to provide a fluid coating of equal thickness on both sides of the soft contact lens for accuracy in optical power measurement readings.

One other object of this invention is to provide a lens measuring apparatus including a wiper blade member of a unique design to achieve the wiping features of this invention.

Still, another object of this invention is to provide a method for measuring soft contact lenses utilizing a lens holding apparatus which has a lens holder assembly with a contoured lens support member to duplicate a portion of a person's eye structure and having a lens conditioner means which is operable to place a uniform contact lens fluid above and below the supported soft contact lens so as to simulate the holding thereof in a person's eye during normal wearing thereof to achieve accurate optical lens power reading.

One further object of this invention is to provide a method and apparatus for measuring soft contact lenses which is easy to use; reliable in operation; economical to manufacture; and substantially maintainence free.

Various other objects, advantages, and features of this invention will become apparent to those skilled in the art from the following discussion, taken in conjunction with the accompanying drawings, in which:

FIGURES OF THE INVENTION

FIG. 1 is a perspective view of a lens holding apparatus of this invention;

FIG. 2 is a fragmentary front elevational view of the lens holding apparatus illustrating operation thereof in dotted lines;

FIG. 3 is an enlarged fragmentary sectional view taken along line 3—3 in FIG. 2;

FIG. 4 is an enlarged perspective view of a wiper blade member of the lens holding apparatus of this invention;

FIG. 5 is a perspective view of a soft contact lens;

FIG. 6 is a sectional view of the wiper blade member illustrated in FIG. 4 taken along line 6—6;

FIG. 7 is a fragmentary perspective view illustrating the wiping action of the wiper blade member of the lens holding apparatus of this invention;

FIG. 8 is a perspective view illustrating the lens holding apparatus of this invention as mounted on the lensmeter for taking optical measurements of the soft contact lens; and FIGS. 9, 10, 11, and 12 disclose method steps of utilizing the lens holding apparatus of this invention.

The following is a discussion and description of preferred specific embodiments of the lens holding apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail and in particular to FIG. 8, the invention relates to a method and apparatus for measuring soft contact lens and includes a lens holding apparatus 10 having a soft contact lens 11 mounted thereon and adapted to be supported and operable with a lensmeter 12. The lensmeter 12 can be of various types and is well known in the prior art to measure the power of spectacles, soft and hard contact lenses although not previously usable satisfactorily for soft contact lenses. The lensmeter 12 includes an apparatus holder 15; a lens holder 16; an eyepiece 17; and internal target 18; and a focus knob 19. The focus knob 19 is operable to axially move the internal target 18 which is sighted through the soft contact lens 11 to ascertain the optical power thereof.

As noted in FIG. 1, the lens holding apparatus 10 includes (1) a basic support housing means 14; (2) a lens holder assembly 16 connected to the basic support housing means 14; (3) a lens conditioner means 18 mounted on the basic support housing means 14 and operably engagable with the lens holder assembly 16; and (4) a lens guard and connector assembly 20 pivotally connected to the basic support housing means 14 and operable to provide a guard and connector structure to the lens holder assembly 16 as will be explained.

The basic support housing means 14 includes a main support wall 22 having integral therewith an arcuate end wall 24; a first side wall 26; and a second side wall 28. The main support wall 22 has a lens holder opening 30 therein provided with internal threads 32 to receive a portion of the lens holder assembly 16.

The arcuate end wall 24 has a curved fluid receptacle section 34 to retain fluids therein as will be noted.

The first side wall 26 and the second side wall 28 are integral with the fluid receptacle section 34 of the arcuate end wall 24 and the main support wall 22. The first side wall 26 is provided with an arcuate top edge 36 and a linkage shaft support opening 38.

The second side wall 28 includes a main body section 40 having an arcuate top edge section 42; an actuator slot section 44; and a linkage shaft support opening 46. The arcuate top edge section 42 is provided with a connector support portion 48.

The arcuate slot section 44 is provided with a first inclined portion 50 integral with a second inclined portion 52 to provide for the necessary operation of the lens conditioner means 18 as will be explained.

As shown in FIG. 3, the lens holder assembly 16 includes a lens support base 54; a contoured lens support member 56 mounted on the lens support base 54; and a transparent base seal member 58 connected to the lens support base 54. The lens support base 54 includes a support body 60 integral with a connector section 62 and a central cylindrical bore 64. The connector section 62 is provided with external threads to be releasably mounted within the lens holder opening 30. The contoured len support member 56 is designed to duplicate the cornea area of an average person's eye and provided with a transparent lens support surface 68 to receive the soft contact lens 11 thereon.

The base seal member 58 is provided with a transparent lens seal member 72 mounted on an outer end of the connector section 62 and covering the central cylindrical bore 64 to provide for a seal to prevent liquid condensation from occurring therein which would affect operation of this invention.

The lens conditioner means 18 includes (1) a lens wiper assembly 74; (2) an actuator linkage assembly 76 connected to the lens wiper assembly 74; and (3) an actuator movement assembly 78 operably connected to the actuator linkage assembly 76 for movement thereof as will be explained.

The lens wiper assembly 74 includes a wiper mounting assembly 80 having a wiper blade member 82 mounted thereon. The wiper mounting assembly 80 includes an L-shaped main support base 84; a pair of wiper anchor plates 86 connected to the main support base 84; and a linkage support shaft 88 which is connectable to the actuator linkage assembly 76.

The main support base 84 includes a base section 90 having a pair of spaced parallel support fingers 92 and 94. The base section 90 is provided with upright extended connector lugs 96 having shaft support holes 98 therewithin.

The support fingers 92, 94 each have a pair of spaced threaded connector holes 102 therein.

The wiper anchor plates 86 consist of anchor straps 104 and screw members 108 which are mounted between the anchor straps 104 and threaded within the threaded connector holes 102 to clamp the wiper blade member 82 therebetween.

The linkage support shaft 88 is provided with outer end portions 110 which are engagable with the actuator linkage assembly 76.

As noted in FIG. 4, the wiper blade member 82 includes a wiper body section 112 having the integral wiper head section 114 along one edge thereof. The wiper head section 114 is provided with a projecting lip portion 116.

The actuator linkage assembly 76 includes a wiper linkage assembly 118 connected to a main support linkage assembly 120. The wiper linkage assembly 118 includes a link arm member 122 having a main support body 124 integral with a handle support section 126.

On referring to FIG. 12, the main body 124 includes an integral shaft portion 128 having a link shaft opening 130 therein. The handle support section 126 is provided with a handle connector opening 132.

The main support linkage assembly 120 includes (1) a main support shaft assembly 136; (2) a main link assembly 138; and (3) a biasing assembly 140. The main support shaft assembly 136 includes a central portion 142 integral with outer end support portions 144.

The main link assembly 138 includes a central section 146 having parallel integral link arm sections 148. Each link arm section 148 is provided with a support shaft opening 150 and the link shaft opening 152. The link shaft openings 152 are adapted to receive the link support shaft 88 with its outer end portions 110 therein.

The biasing assembly 140 includes a spring member 154 and a stop member 156. The spring member 154 includes a stop end 158 integral with a coiled central section 160 and a link arm connecter end 162. The stop end 158 is adapted to engage the stop member 156 while the coiled central section 160 is placed about the main support shaft assembly 136. The link arm connector end 162 is mounted about one of the link arm sections 148.

The stop end 158 is engagable with the stop member 156 to provide a reaction force for moving the main link assembly 138 to the non-usage condition after being moved against the bias of the spring member 154 in a manner to be explained.

The actuator movement assembly 78 includes an actuator handle assembly 166 having a connector section 168 with a handle member 170 connected thereto and an actuator support lug 169. The connector section 168 is provided with a connector portion 172 and a spacer portion 174 to provide ease of movement and guidance within the actuator slot section 44. The handle member 170 is provided with a knurled outer surface 178 for ease of grasping for moving the entire actuator lens conditioner 18 as will be explained.

The actuator support lug 169 includes a support section 180 integral with the finger section 182. The support section 180 is secured by an anchor member 186 to the second side wall 28.

The lens guard and connector assembly 20 is provided with a connector body member 188 and a connector hinge assembly 190 which, in turn, is secured to the guard support portion 48 of the second side wall 28. The connector body member 188 is generally L-shaped having the main body section 192 with an outer support section 193. The outer support section 193 is operable to engage the top surface of the main support wall 22 when in the lens protecting and connecting position as shown in FIG. 1. The main body section 192 is provided with an observation opening 194 movable over the lens support surface 68.

The connector hinge assembly 190 includes a pivotal hinge member 198 secured to the main body section 192 and the second side wall 28 by connector members 199.

USE AND OPERATION OF THE INVENTION

In the use and operation of lens holding apparatus 10 of this invention on referring to FIG. 8, it is seen that the conventional lensmeter 12 is utilized having the lens holder 15 thereon. The lens holder 15 is operable to receive the lens holding apparatus 10 of this invention thereon in the proper position for viewing through the eyepiece 17 with adjustment, use, and movement of the internal target 18 controlled by the focus knob 19.

In use of the lens holding apparatus 10, it is generally held in one of the operator's hand with the lens guard and connector assembly 20 in an open position and an proper lens holder assembly 16 is selected. A plurality of the lens holder assemblies 16 can be provided with contoured support members 56 of various curvatures so as to be usable for all diameters, thicknesses, and contours of soft contact lenses to be measured. Generally, there is a common lens holder 16 which ressembles a normal person's cornea for receiving the soft contact lens 11 thereon but another lens holder assembly 16 can be used for large and small soft contact lenses 11.

Due to the threaded nature of the connection of the lens support base 54 which can be releasably mounted within the lens holder opening 30 of the main support wall 22, the various lens holder assemblies 16 can be interchanged.

The initial step is to cleanse the lens support surface 68 with a soft lens cleaning solution 204 which is necessary due to the delicate nature of the soft contact lens 11 which can be easily contaminated. This cleansing operation is shown in FIG. 9 whereupon an eye dropper 201 is utilized to put the cleansing solution 204 on a center of the lens support surface 68.

At this time, the actuator movement assembly 78 and, more particularly, the handle member 170 is moved forwardly with an operator's thumb on the handle member 170 and a forefinger on the actuator support lug 169 which moves the wiper blade member 82 over the soft contact lens 11 which is supported on the lens support surface 68. This provides a new and unique "wiping movement" due to the special configuration of the wiper blade member 82 as noted in FIGS. 4 and 12.

Next as noted in FIG. 11, a soft contact lens saline solution 206 is placed thereon by eyedropper member 201 to first rinse and then wet the lens support surface 68. The actuator movement assembly 78 is operated to repeat the "wiping movement" of the wiper blade member 82 on the lens support surface 68.

As shown in FIG. 10, a soft contact lens 11 to be measured is grasped delicately by the operator's forefinger and thumb and placed and centered on the lens support surface 68. Then, the soft contact lens saline solution 206 is applied to the top surface of the soft contact lens 11 which, at this time, provides a nonuniform thickness of fluid on both sides of thereof.

The operator may choose to utilize two (2) wiping movements to achieve the proper squeegee effect on the soft contact lens 11 which squeezes out excessive fluid thereunder and leaves a desirable thickness of contact lens saline solution 206 on both sides of the soft contact lens 11. This leaves the soft contact lenses 11 on the lens support surface 68 in a natural relaxed state as it would on the eye following a blink movement.

The unique movement of the lens wiper assembly 74 is achieved through the actuator linkage assembly 76 and, more particularly, because of the actuator slot section 44 which provides (1) a first sharp downward movement to place the wiper blade member 82 adjacent and below the lens contact surface 68; and (2) a second forward and downward movement of the lens wiper assembly 74. The flexibility of the wiper blade member 82 provides a squeegee action against the soft contact lens 11 across and against its entire surface.

Next, the lens guard and connector assembly 20 is placed in the closed or guard and connector position as shown in FIG. 1 which allows for observation of the soft contact lens 11 through the observation opening 194 in the connector body member 188.

Next, the lens metering apparatus 10 is placed on the lensmeter 12 and the operator utilizes the focus knob 19 which moves the internal target 18 to measure the optical power of the soft contact lens 11 being held thereby. As needed, further "wiping movements" of the wiper blade member 82 and addition of the saline solution 206 to the soft contact lens 11 is conducted.

It is noted that the wiper blade member 82 has the unique wiper head section 114 with the lip portion 116 which achieves the new and novel wiping action on the soft contact lens 11 to provide a pressure there against to remove excess contact lens saline solution 206 from under the soft contact lens 11. On the backstroke movement towards the arcuate end wall 24, the lip portion 116 acts to provide a uniform thickness of the contact lens solution 206 on the top surface of the soft contact lens 11.

In the method for measuring the power of soft contact lenses of this invention, the first step is to cleanse the lens support surface 68 of the contoured lens support member 56 of the lens holder assembly 16 with a soft lens cleaner solution 204 and the "wiping movement" of the wiper blade member 82 is conducted.

Next, the operator rinses the lens support surface 68 with the soft lens saline solution 206 which wets the mounting surface and rinses away the cleaner solution 204. Next, the actuator linkage assembly 76 with the actuator movement 78 is operable to move or flip the wiper blade member 82 over the lens support surface 68. This tends to wet the under surface of the wiper blade member 82 and spread the soft lens saline solution 206 evenly over the lens support surface 68. The wiper blade member 82 acts similar to a squeegee.

In the following step, the operator places a soft contact lens 11 on the support surface 68 and the lens wiper assembly 74 is acuated to provide a smoothing action over the soft contact lens 11 to achieve the function of a uniform thickness of the soft lens saline solution 206 over and under the soft contact lens 11.

Next, the lens holding apparatus 10 is placed on the lens holder 15 of the lensmeter 12 and the operator utilizes the focus knob 19 and axially moves the internal target 18 to obtain an accurate optical power measurement of the soft contact lens 11. Also, periodic rewetting of the soft contact lens 11 will be achieved by the "wiping movement" of the wiper blade member 82.

The lens holding apparatus of this invention can be utilized as an adaptor to the numerous presently marketed lensmeter structures or could become a permanent feature on a new manufactured lensmeter.

The lens holding apparatus is economical to manufacture; easy to use; simple in operation, reliable in optical power measurements; and substantially maintenance free.

While the invention has been described in conjunction with preferred specific embodiments thereof, it is to be understood that this description is intended to illustrate and not to limit the scope of the invention, which is defined by the following claims.

I claim:

1. A lens holding apparatus used to measure the power of soft contact lenses in conjuction with a lensmeter, comprising:
   (a) a basic support housing means;
   (b) a lens holder assembly connected to said basic support housing means including a lens support member having a lens support surface to receive a soft contact lens thereon;
   (c) a lens conditioner means connected to said basic support housing means and having a lens wiper assembly initially positioned adjacent and out of contact with said lens support surface in a non-use position and selectively engagable with the lens support surface; and
   (d) said lens wiper assembly having a wiper blade member which is selectively moved and engaged with said lens support member to provide a uniform thickness of a fluid solution thereon.

2. A lens holding apparatus as described in claim 1, wherein:
   (a) said lens support member having said lens support surface to duplicate the contour of the cornea of a person's eye to receive the soft contact lens thereon;
   whereby the soft contact lens is held on said lens support surface and a fluid of uniform thickness is applied to both sides of the soft contact lens to duplicate the conditions when worn on the cornea of a person's eye for accurate measurement of the soft contact optical power by the lensmeter.

3. A lens holding apparatus as described in claim 1, wherein:
   (a) said lens conditioner means includes an actuator linkage assembly connected to said basic support housing means which is, in turn, connected to said lens wiper assembly; and
   (b) said actuator linkage assembly includes a support linkage assembly connected to a wiper linkage assembly operable to move said lens wiper assembly to provide a contoured uniform wiping action of said wiper blade member over said lens support surface.

4. A lens holding apparatus as described in claim 1, including:
   (a) a lens guard and connector assembly having a connector body member which is pivotally connected to said basic support housing means and movable from a first open condition to allow ready access to said lens holder assembly and to a second position over said lens holder assembly to protect the said lens support member and a soft contact lens mounted thereon against damage.

5. A lens holding apparatus as described in claim 4, wherein:
   (a) said lens guard and connector assembly includes a connector body member of generally L-shaped having an outer support section engagable with said basic support housing means to provide for support and prevent further movement in one direction.

6. A lens holding apparatus as described in claim 1, wherein:
   (a) said lens support member releasably connected to said basic support housing means; and
   (b) multiple ones of said lens support members are provided each having various curvatures of said lens support surface; and said lens support member selected dependent on the curvature of the soft contact lens being measured and type of lensmeter being utilized.

7. A lens holding apparatus as described in claim 1, wherein:
   (a) said wiper blade member constructed of a flexible material to deform and act as a squeegee against and conform to the outer surface of the soft contact lens and said lens support surface when moved transversely thereof to remove any excess fluid solution but leaving a uniform thickness of the fluid solution on both sides of the soft contact lens.

8. A lens holding apparatus as described in claim 3, wherein:
   (a) said support linkage assembly pivotally connected to said basic support housing means and said wiper linkage assembly which, in turn, is connected to said wiper blade member; and
   (b) said support linkage assembly includes a biasing assembly operable to bias said wiper blade member to said non-use position.

9. A lens holding apparatus as described in claim 8, wherein:
   (a) said basic support housing means includes a side wall having an arcuate actuator slot therein to receive an actuator handle of said actuator linkage assembly therethrough to control forward and downward movement of said wiper blade member into squeegee with said lens support surface.

10. A lens holding apparatus as described in claim 1, wherein:
    (a) said wiper blade member includes a wiper body section integral with a laterally extended wiper head section that initially contacts said lens support member with a soft contact lens mounted thereon during a wiping, squeegee operation.

11. A lens holding apparatus as described in claim 8, wherein:
    (a) said lens wiper assembly including an actuator support lug connected to said basic support housing means; and
    (b) said actuator support lug provides a stationary reaction member to an operator's finger when moving said support linkage assembly by the operator's thumb.

12. A lens holding apparatus used to measure the power of soft contact lenses in conjunction with a lensmeter, comprising:
    (a) a basic support housing means;
    (b) a lens holder assembly connected to said basic support housing means including a lens support member having a lens support surface to receive a soft contact lens thereon;

(c) a lens conditioner means connected to said basic support housing means and having a lens wiper assembly selectively engagable with said lens support member, (d) said lens wiper assembly having a wiper blade member which is selectively moved and engaged with said lens support surface to provide a uniform thickness of a fluid solution thereon to duplicate the conditions when worn on the cornea of a person's eye;

(e) said lens conditioner means includes an actuator linkage assembly pivotally connected to said basic support housing means and said lens wiper assembly; and (f) said actuator linkage assembly selectively movable from a retracted position to an extended position to move said wiper blade member into contact with said lens support surface on said lens support member to achieve a wiping squeegee action thereon to apply a uniform thickness of fluid solution thereon to duplicate the conditions when worn on the cornea of a person's eye.

13. A method for measuring the optical power of soft contact lenses with a conventionally available lensmeter, comprising:

(a) utilizing a lens holding apparatus to be mounted on the lensmeter including a basic support housing means; a lens holder assembly connected to said basic support housing means; and a lens conditioner assembly connected to said basic support housing having a wiper blade member engagable with a lens support surface of a lens support member of said lens holder assembly;

(b) applying a solution to said lens support surface of the said lens support member;

(c) mounting a soft contact lens on said lens support surface of said lens support member; and (d) wiping a top surface of the soft contact lens with said wiper blade member to apply an even coating of the solution to both sides of the soft contact lens to duplicate the conditions when worn on the cornea of a person's eye.

14. A method for measuring the power of soft contact lens as described in claim 13, including:

(a) before applying the solution to said lens support surface, applying a cleansing solution to said lens support surface to remove particles therefrom.

15. A method for measuring the power of soft contact lens as described in claim 13, wherein:

(a) after said wiping a top surface of the soft contact lens, retracting said wiper blade member over the soft contact lens and said lens support surface to apply an even thickness of the solution to the top surface of the soft contact lens.

16. A method for measuring the power of soft contact lens as described in claim 15, wherein:

(a) said wiping of a top surface of the soft contact lens, extending past an outer periphery to move excess solution across a top surface of the soft contact lens to coat same.

17. A method for measuring the power of soft contact lens as described in claim 13, including:

(a) measuring the optical power of the soft contact lens mounted on said lens holder assembly by the lensmeter.

18. A lens holding apparatus as described in claim 12, wherein:

(a) said lens support surface of an outer contour selected to duplicate the contour of the cornea of a person's eye to receive the soft contact lens being examined thereon.

19. A lens holding apparatus as described in claim 12, wherein:

(a) said actuator linkage assembly connected to said wiper blade member to move same from a non-use position out of contact with said lens support member and operable to move said wiper blade member in an arcuate downwardly and outwardly motion to effectively, selectively wipe and squeeze said lens support surface or the contact lens mounted thereon.

20. A lens holding apparatus as described in claim 12, wherein:

(a) said wiper blade member includes a wiper body section having an integral wiper head section; and (b) said wiper body section being flexible and contacts a substantial area of said lens support surface and the soft contact lens mounted thereon during a squeegee operation.

* * * * *